United States Patent [19]
Spaite

[11] 3,759,196
[45] Sept. 18, 1973

[54] REFUSE DISPOSAL AND HEAT RECOVERY IN STEAM BOILERS

[75] Inventor: Paul W. Spaite, Cincinnati, Ohio

[73] Assignee: A. M. Kinney, Inc., Cincinnati, Ohio

[22] Filed: Dec. 13, 1971

[21] Appl. No.: 207,143

[52] U.S. Cl. .................................. 110/8 R, 110/15
[51] Int. Cl. .............................................. F23g 5/00
[58] Field of Search ..................... 110/7 R, 7 S, 8 R, 110/10, 15

[56] References Cited
UNITED STATES PATENTS

| | | | |
|---|---|---|---|
| 3,638,590 | 2/1972 | Roberts et al. | 110/7 |
| 3,357,375 | 12/1967 | Brophy | 110/7 |
| 2,151,079 | 3/1939 | Bowen | 110/8 |
| 2,213,668 | 9/1940 | Dundas et al. | 110/15 |
| 3,304,894 | 2/1967 | Cox et al. | 110/15 |
| 3,580,193 | 5/1971 | Logan et al. | 110/8 |

Primary Examiner—Kenneth W. Sprague
Attorney—James S. Hight et al.

[57] ABSTRACT

This invention is directed to a process for disposing of refuse and recovering heat therefrom for use in conventional steam boiler furnaces. The process involves the production of pulped refuse for firing with primary carbonaceous fuels of the gas, coal and oil type while maintaining consistency and stability in boiler power plant operation. Significant economies and ecological advantages are also achieved in the two-fold function of waste disposal and heat recovery in accordance with the method disclosed.

12 Claims, 1 Drawing Figure

PATENTED SEP 18 1973 3,759,196
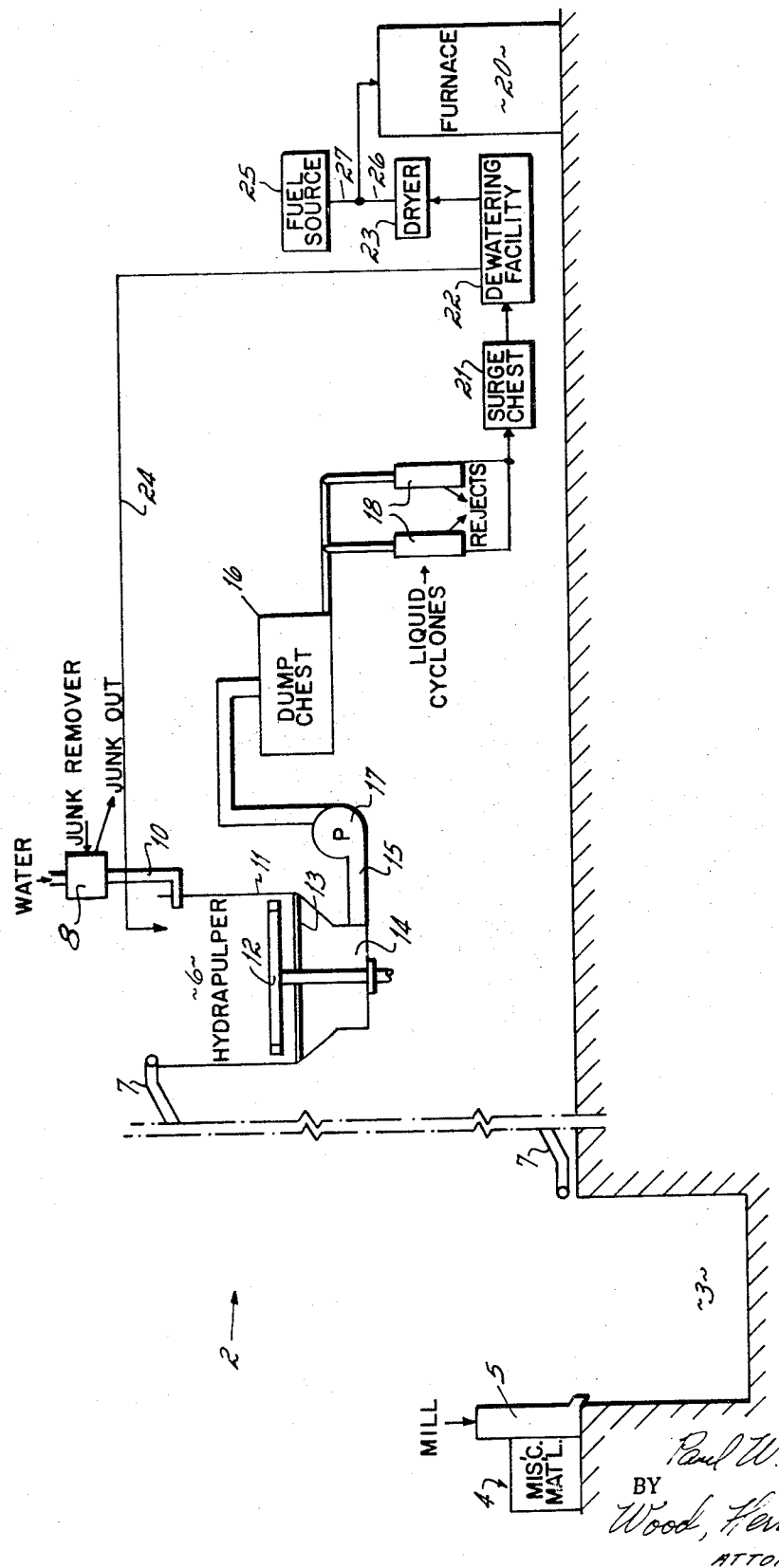
INVENTOR.
Paul W. Szaite
BY
Wood, Herron & Evans
ATTORNEYS

REFUSE DISPOSAL AND HEAT RECOVERY IN STEAM BOILERS

BACKGROUND OF THE INVENTION

Several hundred billion pounds of refuse are being generated presently each year in the United States alone. The term "refuse" is a term of art which denotes, as indicated for example, in the American Paper Institute Report No. 114, Sept. 11, 1967, a conglomeration of such diverse materials as cardboard, newspaper, miscellaneous paper, plastic film, leather, molded plastics, rubber, garbage, grass and dirt, textiles, wood, glass, ceramics, stones and metallics, and when used herein it is used in this technically accepted sense. A typical analysis of such waste material is set forth in the mentioned API Report as: paper 46%, plastic film 2%; leather, molded plastics and rubber 2%; garbage 12%; grass and dirt 10%; textiles 3%; wood 7%; glass, ceramics and stone 10% and metallics 8%. The percentages of such diverse materials will vary somewhat depending upon the time of year, geographical location and habit of the industrial and municipal communities.

More emphasis than ever before is being placed upon the disposal of refuse in view of our national interest in ecology and pollution of our atmosphere, land and water. Prior workers have addressed themselves to the problems associated with the disposal of refuse collected from industrial, residential and commercial sources. One of the more common methods which has been proposed is to incinerate such refuse. However, government regulations are becoming very stringent with respect to the types and concentrations of pollutants that may be discharged into the physical environment, virtually prohibiting incineration of wastes by many of the heretofore commonly accepted techniques. Similarly, large amounts of convenient open space are no longer available for sanitary land fills, and in any event communitites can no longer tolerate contamination of streams and under-ground waters from such fills.

In addition, it has been an objective for many years to reclaim or recover heat from waste materials for useful purposes. Particular attention has been given to the recovery of heat from bark, bagasse, pitch, garbage, sewage, etc. Patents that are representative of this state of development of the art of refuse disposal and recovery of heat value from refuse include U.S. Pat Nos. 994,002; 1,195,784; 1,431,225; 1,454,082; 1,973,705; 2,057,450; 2,246,224; 2,294,242; 2,389,077; 2,875,735; 2,925,055; 3,041,986; 3,109,392; 3,166,032; 3,301,201; 3,304,894; 3,358,625; 3,387,574; 3,391,661; 3,549,010-11 3,549,092 and 3,549,529.

Very early in the development of the art in connection with the dual objective of disposing of refuse and of recovering its useful heat value, it was proposed to isolate the high heat value components of refuse prior to the utilization of those components in steam boilers. Some of the techniques for such isolation or separation produced refuse fuels that generated critical problems in steam boiler operation. Moreover, processes for firing refuse into a conventional steam boiler furnace in a utility power plant or industrial steam plant operation involve additional problems of a special nature. Much effort has in the past been directed to the treatment, therefore, of refuse to make it attractive as a fuel for power plant consumption where a premium is placed on uniformity and stability in operation. A completely satisfactory refuse fuel has not heretofore been discovered. Two of the main problems with partially refuse-fired boilers have been fouling of boiler heating surfaces and corrosion. In a refuse-fired boiler, all heating surfaces, including, for example, water walls, super heater, airheater tubes, etc., are vulnerable to fouling from slag and flyash deposition. Corrosion in refuse-fired boilers consists, for example, in high temperature, liquid phase corrosion or low temperature or dew point corrosion. The former may be caused by molten alkali metals, by HCl or Cl, or may be attributable to partial combustion products such as carbon monoxide or hydrogen sulfide. Low temperature corrosion on the other hand leads to a condensation of corrosive constituents on the surfaces of the internal boiler components mentioned above.

One approach to the solution of these problems has been the dry shredding of garbage and refuse. However, the necessary shredding equipment is not only unduly expensive but the shredded refuse remains heterogeneous and is unsanitary, corrosive, and without consistency of heat value. Thus, the desired stability and unifromity is not achieved in the power plant or industrial steam boiler operation. Moreover, dry shredding does not produce particles sufficiently uniform in composition, and sufficiently small in size and low in ash, for easy movement and manipulation by pneumatic or other handling or conveying equipment or for easy firing in boilers.

In substance, a means has not heretofore been reported for supplying a conventional steam boiler furnace with a refuse fuel the composition of which has sufficient consistency of chemical and physical properties to meet the requirements of steam generating plants for operational stability, without serious corrosion and boiler fouling problems.

SUMMARY OF THE INVENTION

This invention consists of a unique method of combining refuse disposal and heat recovery in conventional steam boiler furnaces, especially those of electrical power plants. The invention overcomes a number of problems heretofore associated with the prior art techniques discussed above. In accordance with the principles of the invention, a heterogeneous mixture of refuse, containing paper, plastic film, leather, molded plastics, rubber, garbage, grass, dirt, textiles, wood, glass, ceramics, metallics and the like is converted into a refuse fuel consistent in composition and having properties that enable it to overcome the problems otherwise associated with refuse-firing in steam boiler furnaces.

In its general aspect, this invention provides a process for refuse disposal and heat recovery in conventional steam boiler furnaces by means of a wet technique for disintegrating and mixing refuse in such manner as to facilitate separation of its combustible from its non-combustible elements, separating such elements, and blending the combustible elements in such manner as to render them suitable for firing in such furnaces and for transportation and storage prior to firing. The steps of this process include the addition of water to refuse to form a pulpable mixture. The mixture is then pulped in a conventional Hydrapulper to disintegration. Thereafter, a slurry is extracted that contains principally fibrous combustible particles of predetermined dimensions. The extracted slurry is then concentrated by removal of water. The combustible concentrate is then combined with a carbonaceous fuel for burning in conventional steam boiler furnaces. There are preferred conditions of this technique which will be developed hereinafter based upon the present state of development of this invention and its present best mode of operation.

Pulped municipal refuse according to this invention has been found to possess the property of such compositional consistency of moisture, volatiles, fixed carbon, and ash as to make it suitable for economical firing with and supplementally to carbonaceous gaseous, liquid, or solid fuels in steam boiler furnaces. The range of composition of each of these elements, moisture, volatiles, fixed carbon, and ash is very narrow even though the pulped refuse is derived from a heterogeneous mass of industrial and municipal wastes. In accordance with the principles of this invention, it has been determined that refuse can be disintegrated into particles of a mesh particularly suitable for storage, and handling and conveying, pneumatically or otherwise and for firing with primary fuels of the type just mentioned and rapid and efficient combustion in conventional steam boiler furnaces without detriment to stability of the combustion process within such furnaces. What has been heretofore considered an inferior fuel source, impractical for the development of heat energy in high pressure steam boiler operation due to its corrosive properties, heterogeneous combustive nature, and the like, has been found capable of conversion into a highly useful supplemental fuel.

The method of this invention offers municipal governments an integrated waste disposal system and recovery of heat for steam-generation of electricity with greater efficiency than is possible with other systems.

A further specific object of this invention is to process municipal refuse into such form and state as will enable it to be disposed of with less pollution of the physical environment than is associated with the operation of incinerators and sanitary land fills.

An additional object of this invention is the nearly complete separation of the combustible elements of refuse from the non-combustible elements and the reduction of such non-combustibles to minor amounts that can be injected into steam boiler furnaces without the fouling of such furnaces, and the corroding or destroying of the materials of which the heating surfaces of such furnaces are conventionally made, that results from use of the refuse fuels developed by prior art techniques.

A further object is to convert refuse into a homogeneous mass in which offensive, toxic, unsanitary, and hazardous materials are mixed with added water and with non-toxic, non-hazardous refuse components to produce a combustible product that can be transported and stored, and burned with ease in conventional steam boilers.

A preferred technique for pulping refuse for use in this invention is that of the type disclosed in U.S. Pat. Nos. 3,549,010–11 and 3,549,092, mentioned above. These patents, however, do not appreciate the advantageous discovered properties and utilities of pulped refuse herein described relative to steam boiler plant operations. These patents do, however, teach the treatment of refuse, including industrial and municipal refuse, that comprises a mass of many different types of relatively frangible materials, including fibrous and other organ substances, as well as metal and other inorganic materials. The main device relied upon in these patents to accomplish such treatment is a Hydrapulper, which hydraulically shears and mechanically degrades and mixes the refuse. These patents also teach the removal of infrangible materials, larger metal particles, ropy materials, and the like from refuse, and the extraction of an aqueous slurry of fibrous and other organic substances and frangible inorganic materials of a limited particle size.

According to this invention, the proportion of nonconbustible elements present within an extracted slurry is significantly lower than in the case of refuse fuels developed by prior art techniques. Pulped refuse fuel herein described is therefore burned with improved results over prior art heterogeneous refuse fuels when injected into steam boiler furnaces. It is preferred, however, in the practice of this invention to carry more nearly to completion the removal of non-combustibles, such as glass, ferrous metals, aluminum, etc., by additional processing of the extracted slurry, either before or after dewatering or concentration of the slurry in preparation for introduction of the pulped refuse concentrate into steam boiler furnaces. Such additional processing may be accomplished at minor and inconsequential cost. Furthermore, if desired, paper-making fibers also may be recovered from the extracted slurry.

Pulped refuse concentrate produced by the process steps of this invention is consistent in composition of volatiles, fixed carbon, ash and moisture. A composition of refuse, after being processed according to this invention, has been demonstrated by analyses of samples taken at regular intervals to be approximately 33–39% volatiles, 3–6% fixed carbon, 3–5% ash and 53–60% moisture by weight. Even where treatment to recover paper-making fibers is practiced, as mentioned above, this compositional consistency is not materially affected. Such consistency assures that the heat value of the pulped refuse will only vary within a very acceptable range, in the interests of stable steam boiler furnace operation. Furthermore, the stated range of ash content is very acceptable in conventional steam boiler furnace operation and is considerably lower than the ash content expected in other known refuse fuels for steam boilers.

These data show only very slight variances in the respective percentages of volatiles, carbon, and ash with the pulped refuse. The narrowness of these ranges is important to the maintenance of stable operations within steam boiler furnaces using the pulped refuse fuel and therefore to the practicability of such use. The low ash content eliminates the need for handling larger amounts of ash involved in the use of dry shredded refuse fuel.

The process of this invention is preferably conducted in such manner as to produce pulped refuse containing principally fibrous particles no greater than approximately one inch in greatest dimension. Pulped refuse particles of that size are suitable for suspension firing with carbonaceous fuel, resulting in rapid and complete combustion and efficient production and generation of heat and steam, and also for firing steam boiler furnaces of most other conventional designs. This particle size is also particularly well suited for handling, storage and pneumatic conveyance.

The dry shredding technique does not, to nearly as great a degree, disperse throughout the refuse, in the course of its preparation as a fuel, the varying elements present in the refuse as received. In fact, the hereterogeneity of the dry shredded refuse is such that the respective percentage ranges by weight of each of the volatiles, carbon, ash and moisture components may vary 25-50 percentage points or more from their respective mid-range values.

The maximum amount of pulped refuse that can be efficiently combined with carbonaceous primary fuel for introduction into conventional steam boiler furnaces is approximately 20 percent of the total heat input. Amounts not exceeding 20 percent may be used without significant alteration of steam boiler equipment or technique. Amounts less than 5 percent would not justify the investment required to enable such utilization.

The moisture content of the pulped refuse at the dewatering step is reduced to approximately 60 percent by weight. It may additionally be reduced to approximately 20 percent by weight by means of drying equipment used in conjunction with a furnace.

Among the many other advantages of the discovered method, in contrast to dry shredding preparation and other techniques of the prior art, as particularly related to steam boiler operations, are: the use of proven equipment that can be assembled without much sophistication; quieter, cleaner, and more trouble-free housekeeping and sanitary operations; clean removal of non-combustibles in a condition that permits recovery of valuable components; size reduction and compaction of metal and glass ejects; simplified handling of the waste fuel as a slurry; ease of movement of the fuel to remote power stations, by hydraulic means, with dewatering at destination; cleanliness and inoffensiveness, and ease of handling and storage, of the dewatering fuel; possibility of processing waste materials other than the usual commercial, residential and industrial refuse, including, for example, sewage sludge; possibility of recovering by-product paper fiber, glass, iron, aluminum, etc.; and lower, overall net cost of waste disposal.

These and other advantages of this invention will be further appreciated by reference to the following detailed description and drawing.

The FIGURE in the drawing is a diagrammatic view illustrating a complete refuse disposal and heat recovery plant in accordance with the principles of the method of this invention for operating a conventional steam boiler furnace.

Mixed, unsorted refuse is transported to the refuse processing plant 2 by regular collection trucks or by transfer packer trucks for storage in the receiving pit 3. The storage and surge capacity of pit 3 is necessary since both generation of the refuse and its recycling into electrical power continues 24 hours a day, seven days per week, but refuse collection is usually limited to eight hours per day, five days per week. Rough sorting and mixing is done within the receiving pit 3 to obtain a more uniform distribution of refuse materials such as plastics, paper, garbage, etc., which are the usual components found in the refuse. Also, at this point, large or heavy metal objects such as automobile parts, gargabe cans, drums, heavy lumber, large appliances and furniture can be removed and set aside in a miscellaneous materials area 4 near the pit. From this area, such material can be loaded onto trucks for transportation to direct burial or it can be compacted or otherwise treated prior to burial. In the case of lumber, crates, pallets, and tree trimmings, these are fed into a small size reduction mill 5 located in the same area, which discharges into the receiving pit 3. The shredded wood is then fed with other refuse into a hydro-pulper 6, more particularly, a Hydrapulper generally of the construction disclosed in U.S. Pat. No. 3,339,851 and U.S. Pat. No. 3,549,092. On the basis of present data, it is expected that less than one-half of 1 percent of the material received for treatment would be unsuited for processing in the hydro-pulper 6. The large or heavy metal objects mentioned above can be removed from the receiving pit 3 by means of an overhead crane, not shown.

After the preliminary classification just mentioned, the refuse is delivered by means of an overhead crane to the conveyor 7 to the pulper 6 into which water has been introduced by a supply line 10. A portion of the water is introduced into and through the junk remove 8 so the dirt and putrescible material is removed from the infrangible materials after they are rejected from the pulper 6. For more details on the description of the Hydrapulper 6 and the introduction of materials thereinto, reference is made to U.S. Pat. No. 3,549,092 which illustrates the construction and operation of the hydro-pulper 6. Basically, this pulper includes a tub 11 equipped with a rotor 12 mounted for rotation centrally of the bottom portion of the tub in cooperation with a perforate bed plate 13 and there is a compartment 14 below the bottom of the tub into which the perforate bed plate 13 discharges pulped particles which have been sufficiently reduced in size to pass through its perforations. Usually, these perforations are relatively small size, in the range of about ¼ inch to 1 inch diameter, and the slurry passing therethrough is withdrawn from compartment 14 by means of a conduit 15. The construction and operation of the pulper 6 produce maximum forces of hydraulic shear on its contents, causing defibering of the paper waste material and disintegration of other wastes, both organic and inorganic. The rotor 12 also has a mechanical action which combines with the hydraulic action to compact and and reject non-friable components such as metal cans and the same action causes bottles and other friable materials to be quickly broken into multiple small fragments. Other metal wastes, of larger sizes are also rapidly rejected, while the typical vortical action in the tub causes wires and other stringy or other non-fibrous sheet materials to be wound into a rope-like form for ready removal from above.

Unpulpable materials which are infrangible inorganic materials are rejected from the pulper by means of centrifugal force; these include: the compacted metal and other hard materials which are not sufficiently friable to be reduced to a particle size small enough to pass through the bed plate 13. After exiting, such materials are carried by conveyor (not shown) through water sprays to remove dirt and putrescible materials and rejected in a clean, compacted condition. This is described in the above-mentioned Baxter U.S. Pat. No. 3,549,092 where provision is also made for removing the metal waste of larger sizes and stringy or non-fibrous sheet materials from the tub separately from each other and from the pumpable slurry which passes through the plate 13 into a conduit 15.

The slurry which has been extracted from the hydro-pulper 6 contains frangible material such as pulpable fibrous and other organic materials along with miscellaneous materials such as grass and metal in ground form small enough to pass through the perforated plate 13. A slurry is preferably extracted from the hydro-pulper 6 which contains principally fibrous organic and other combustible particles having predetermined dimensions. Other frangible inorganic or non-combustible particles below the predetermined particle size in minor amount will be extracted depending upon their specific gravity, particle size and shape factor. Preferably, the dimensions of the combustible fibrous particles are no greater than about 1 inch mesh to provide rapid incineration when subsequently fired with carbonaceous fuel and other advantages as described above. Furthermore, the particle to particle uniformity of combustible material is also achieved in the pulper 6. Therefore, at this stage of the process, the heterogeneous input refuse is converted into homogeneous, combustible components of reduced uniform particle size extracted in slurry form with a reduced amount of non-combustibles. This slurry may be dewatered and fired in a boiler furnace, however, it is most advantageous to further reduce the non-combustibles before such firing.

The slurry usually contains approximately 3% solids as extracted and, accordingly, it can be continuously pumped from the pulper 6 to the dump chest 16 using a conventional pump 17. In operation, the slurry concentration may be varied, however, over a range of 1–10% solids. The dump chest may mechanically be agitated and of sufficient capacity to permit further homogenization of the slurry. From the dump chest 16, the slurry is pumped to any one or more liquid cyclones 18 which remove frangible inorganic or non-combustibles such as glass, metal and miscellaneous materials, usually up to approximately 1 inch maximum in size range with most materials less than ¼ inch in size. The washed reject material consists mainly of ground non-combustible material which can be recovered for usage as a fine aggregate for asphalt, concrete and the like, or it may be processed for recovery of by-products such as glass or aluminum. As developed above, in the preferred practice of this process, non-combustible components of this character are nearly completely removed from the pulped combustible particles prior to firing them into the boiler furnace 20. At this process stage, non-combustibles are separable from the water medium of the slurry by liquid cyclones 18 prior to final dewatering or concentration of the pulped refuse as described hereinafter. Also, where paper-making fibers are reclaimed prior to dewatering, the slurry may be subjected to a fiber reclaiming process as described in "Reclaiming Municipal Garbage", *Environmental Science and Technology*, Vol. 5, No. 10, pp. 998–9, October 1971 and "The Franklin Environmental Control Complex, etc.", by W. Herbert, *Tappi*, Vol. 54, No. 10, pp. 1661–3, October 1971 which disclosure is incorporated herein by reference.

The remaining slurry from the liquid cyclones 18, or from the fiber recovery process where one is used, flows under pressure to a surge chest 21, which again, provides additional surge volume and capacity for storage of the slurry during maintenance periods. Surge chest 21 also provides for further mechanical mixing of the slurry to maintain uniformity. From the surge chest 21, the slurry is pumped at a suitable rate to a dewatering facility 22, located either at the refuse processing site or adjacent the boiler furnace 20.

At the dewatering facility 22, the pulped stock is fed to either or any combination of a vacuum filter, screw thickeners, V-cone press or any other means capable of increasing the solids content of the slurry from approximately 3% concentrate up to approximately 40–50% solids, or by other suitable means mentioned in U.S. Pat. No. 3,549,011. The water from the dewatering stage is pumped back to the hydro-pulper for reuse via line 24. Total process water demand requires continuous addition of fresh water, along with recycle water, to the hydro-pulper to make up for water leaving with the pulped refuse fuel. Because there is no excess water for discharge to sewers or streams, no white water clarification is needed.

The amount of dewatering desirable prior to introduction of the relatively moist combustible solids to a steam boiler furnace will vary, but generally this dewatering step using the mentioned means will reduce the moisture content of pulped refuse to approximately 60% by weight. Correspondingly, the solids content will be approximately 40%. The moisture content may additionally be reduced to approximately 20% by weight by means of a dryer 23 used in conjunction with the furnace 20.

The processed refuse concentrate, after dewatering at 22, is constituted by moisture, volatiles, fixed carbon and ash. Proximate analyses of the processed refuse concentrate at this point in the process were performed for the purpose of illustrating consistency of composition and low ash. These analyses were performed on a series of about eight samples taken at different time intervals over a several day processing period. The samples were analyzed in accordance with ASTM D-271 Part 19, 1969 edition and "Municipal Refuse Disposal" by the American Public Works Association (APWA), 2d Edition (1966), Appendix A, Library of Congress Cat. No. 66-25574. The analyses were performed as follows:

| Analysis Parameter | Procedure | Temperature, °C. |
|---|---|---|
| Moisture | APWA | 75 |
| Ash | ASTM D-271 | 750 |
| Volatiles | ASTM D-271 | 950 |
| Fixed Carbon | by definition of ASTM D-271 | |

The results of the analyses were reported as follows:

| Sample No. | Moisture % | Ash % | Volatile % | Fixed Carbon |
|---|---|---|---|---|
| 1 | 57.04 | 4.12 | 32.65 | 6.19 |
| 2 | 56.74 | 4.92 | 33.28 | 5.06 |
| 3 | 53.09 | 5.16 | 36.83 | 4.92 |
| 4 | 54.83 | 5.27 | 34.51 | 5.39 |
| 5 | 54.03 | 4.02 | 38.90 | 3.05 |
| 6 | 57.06 | 3.87 | 35.09 | 3.98 |
| 7 | 59.82 | 3.04 | 33.31 | 3.83 |
| 8 | 57.88 | 3.51 | 34.85 | 3.76 |

It is to be appreciated that the ash, carbon and volatile proportions of the combustible processed refuse will vary somewhat with difference in the refuse collected and fed to the pulper 6. However, it has been discovered that the short term variation in composition will be small as illustrated by the above analyses. This compositional consistency of pulped municipal refuse according to this invention for moisture, volatiles, fixed carbon and ash is an essential factor in making the pulped refuse suitable for economical firing with and supplementally to carbonaceous fuels in steam boiler furnaces. The ranges of composition of each of the components analyzed above over the several day period is approximately 7% moisture, 2% ash, 6% volatile, and 3% fixed carbon. This narrow range is considered remarkable especially since the pulped refuse is derived from a heterogeneous mass of industrial, commercial and residential wastes. Furthermore, the low ash content (3–5 percent) is acceptable in conventional steam boiler furnace operation. Also, Parr Bomb Calorimeter procedure demonstrated an average heat of combustion for the above dried samples tested of about 7300–8000BTU/lb.

The compositional consistency of the processed refuse according to this invention as reported above can be compared with the lack of such consistency in refuse which has been dry-shredded after magnetic metals have been removed. The following analyses have been reported in the literature for dry-shredded municipal refuse on a weight basis, with magnetic metals removed.

|  |  | Range of Variance |
|---|---|---|
| Moisture | 19.69–31.33% | 11.64% |
| Ash | 9.43–26.83% | 17.40% |
| Volatile | 36.76–56.24% | 19.48% |
| Fixed Carbon | 0.61–14.64% | 14.03% |

The compositional ranges of variance for dry-shredded refuse vary over a much broader range when compared with the rather narrow ranges of composition for each of the components of moisture, ash, volatile and fixed carbon of the pulped refuse analyses of this invention reported above. Such a narrow range of variance for the hydro-pulped refuse fuel of this invention distinguishes it from other treated refuse of the type indicated above. Also, the pulped refuse will exhibit a consistently lower ash content (i.e., about 10 percent) than that which has been experienced in previously known refuse fuels for power plants (i.e., about 25 percent) based upon the total ash, volatile and fixed carbon components of the refuse. In contrast to pulped refuse fuel of this invention, therefore, the percentage range of variance for each of the components of dry-shredded municipal refuse as reported above illustrates at least about 25–50 percentage points deviation from the mid-range value.

The processed refuse material, after it leaves the dewatering facility 22, may be passed through dryer 23, as mentioned above to reduce moisture content of the refuse fuel. In addition to the dryer, there may be associated a screener which separates non-combustible particles after dewatering. In the above description, the liquid cyclones 18 separate the rejects or non-combustibles before dewatering. As an alternative or as a supplemental technique, a conventional screener may be associated with the dryer to remove non-combustible particles present in the dewatered stock. Furthermore, for improved conveyance or combustion, it may be advantageous to pass the pulped refuse through a texturizer or fluffer with or without further dewatering.

After dewatering and/or drying, the processed refuse is combined with the carbonaceous fuel from fuel source 25 prior to or in the boiler furnace 20. As mentioned in the summary of this invention, the pulped refuse contains particles which are on the order of about one inch "top size", i.e., greatest dimension. Preferably, in most conventional furnace operations, this particle size will be no greater than about 1 inch top size. This size facilitates refuse handling, transportation to the furnace and feeding of the refuse fuel thereinto. Furthermore, in suspension firing of the refuse fuel-carbonaceous fuel mixture, which is the technique presently recommended for firing in conventional boiler furnaces in accord with this invention, the burning is rapid and complete which aids in steady state operations. Firing wet processed refuse with conventional fuels in cyclone furnaces or boilers with fixed or moving grates would readily be understood to one of skill in the art.

The conventional boiler furnace 20 per se forms no part of this invention as an individual element. Usually, coal-fired boilers are used in large power plants, generally of either the pulverized coal burner of cyclone burner type. Typical examples of these types of apparatus are discussed in "Steam Its Generation and Use" by Babcock and Wilcox, 37th Edition(1963) and "Combustion Engineering" by Combustion Engineering, Inc, Revised Edition (1966), Library of Congress Catalogue No. 66-23939 and reference is made to these textbooks for further details which would advise one of ordinary skill in the art. Other types of boiler furnaces which can be employed include gas and fuel oil fired burners.

The precise manner of introducing the processed refuse and primary fuel into the furnace is not a critical aspect of this invention and it can follow a number of schemes. For example, in a pulverized coal burner of the conventional type, the processed refuse may be fed to an existing coal pulverizer along a path which, prior to introduction into the coal pulverizer, in combined with coal being fed from a bunker. In the coal pulverizer, the processed refuse and coal is pulverized and air is passed into the coal pulverizer to discharge the combined refuse-pulverized coal to a coal burner. Alternatively, coal from a coal pulverizer as a fuel source 25 may be sent along a path 27 which is intersected by a feed path 26 from the dryer 23. Mixing occurs at the intersection of the two paths 26, 27 so that the processed refuse and the pulverized coal mixture can be fed to the boiler furnace. In a traveling grate stoker, for example, where this apparatus would be employed, the refuse is supplied from a processed refuse hopper to a continuous drag feeder having positioned therebeneath a plurality of refuse conduits which in turn intersect a plurality of pneumatic air conduits originating from a single blower source. The processed refuse from a plurality of sources is then conveyed by the plurality of pneumatic or air sources to a furnace for partial suspension burning followed by complete burning on a traveling grate stoker in the conventional manner. Where a fuel oil burner is contemplated, the processed refuse is conveyed to a combination fuel burner where the refuse is blown into the furnace at the same time that fuel oil is introduced through an oil gun or similar device and the two fuels are burned simultaneously. It is to be emphasized that these various techniques may be employed to burn the processed refuse with a primary fuel such as gas, fuel oil and the like, in various furnace designs. The precise technique of mixing either prior to or in the particular furnace forms no part of this invention and, accordingly, the obvious details are left of those of ordinary skill in this art.

The firing ratio of the refuse-carbonaceous fuel i.e., the ratio of the amount of refuse fuel to primary fuel such as coal, gas or liquid fuel can vary over a wide range depending upon furnace and configuration, fuel type, temperature conditions, pounds of steam to be produced, furnace efficiency, furnace capacity and the like. Usually, the firing ratio will be in the range of approximately 20 percent or less of the heat input from the processed refuse fuel and 80 percent or more of the heat input from the primary fuel as developed above. For reasons of economics, equipment availability, capacities, etc., in addition to the factors just mentioned, operation outside of this general range is permissible without departing from the scope of this invention.

Having described this invention and its presently best contemplated mode, it will become apparent to those of ordinary skill that obvious variations may be made in view of the above description to obtain the benefits thereof.

What is claimed is:

1. A process for refuse disposal and heat recovery therefrom for use in a conventional steam boiler furnace which comprises,
    adding water to refuse to form a pulpable mixture,
    pulping said mixture to disintegrate the refuse,
    extracting from the pulped refuse a slurry containing combustible particles having predetermined dimensions,
    concentrating said slurry by removal of water therefrom to form a pulped concentrate of said combustible particles, and
    combining a carbonaceous fuel with said concentrate and burning the combination in a conventional steam boiler furnace.

2. The process of claim 1 further comprising the step of separating from said slurry non-combustible particles after said extraction.

3. The process of claim 2 wherein paper-making fibers are separated from said slurry.

4. The process of claim 2 wherein said non-combustible particles are separated from said pulped concentrate.

5. The process of claim 1 wherein said pulped concentrate has a moisture content of approximately 60 percent by weight.

6. The process of claim 1 wherein said pulped concentrate is combined in an amount up to about 20 percent of the total heat content of said combination.

7. The process of claim 6 wherein said amount is within the range of about 5-20 percent of said total heat content.

8. The process of claim 1 wherein said particles are of a mesh size no greater than about 1 inch.

9. The process of claim 8 wherein said particles have a substantially uniform particle to particle dimension.

10. The process of claim 1 wherein said pulped concentrate has a compositional consistency of moisture, volatiles, fixed carbon and ash to provide stable steam boiler furnace operation.

11. The process of claim 1 wherein said pulped concentrate is combined with said fuel for continuous feeding and burning in said furnace and wherein said pulped concentrate has a compositional consistency of moisture, volatiles, fixed carbon and ash to provide a stable steam boiler furnace operation.

12. A process for refuse disposal and heat recovery therefrom for use in a conventional steam boiler furnace which comprises,
    adding water to refuse in a hydro-pulper to form a pulpable mixture,
    pulping said mixture in said hydro-pulper to disintegrate the refuse and to remove non-friable materials.
    extracting from the pulped refuse a pumpable slurry containing principally fibrous combustible particles having mesh sizes no greater than about 1 inch and a minor portion of non-combustible particles,
    separating an amount of non-combustible particles,
    concentrating said slurry by the removal of water therefrom to form a pulped concentrate of said combustible particles,
    intimately mixing carbonaceous fuel with said pulped concentrate and continuously burning the mixture in a conventional steam boiler furnace,
    said pulped concentrate having a compositional consistency of moisture, volatile, fixed carbon and ash to provide a consistent heat value.

* * * * *

Notice of Adverse Decision in Interference

In Interference No. 98,769, involving Patent No. 3,759,196, P. W. Spaite, REFUSE DISPOSAL AND HEAT RECOVERY IN STEAM BOILERS, final judgment adverse to the patentee was rendered Dec. 17, 1979, as to claim 3.

[*Official Gazette June 10, 1980.*]